United States Patent [19]

Engelbach

[11] Patent Number: 4,811,508

[45] Date of Patent: Mar. 14, 1989

[54] WEDGE CONNECTION ASSEMBLAGE

[75] Inventor: Karl L. Engelbach, Dillenburg, Fed. Rep. of Germany

[73] Assignee: Weyel KG, Haiger, Fed. Rep. of Germany

[21] Appl. No.: 48,199

[22] Filed: May 11, 1987

[30] Foreign Application Priority Data

May 13, 1986 [DE] Fed. Rep. of Germany ....... 3616031

[51] Int. Cl.$^4$ .............................................. G09F 15/00
[52] U.S. Cl. ......................................... 40/607; 403/374
[58] Field of Search .................. 40/607, 606, 605; 403/297, 363, 374, 409.1; 248/223.4, 224.1, 224.2

[56] References Cited

U.S. PATENT DOCUMENTS

| 1,099,764 | 6/1914 | Polansky | 403/409 X |
| 3,811,785 | 5/1974 | Hagglund | 403/374 X |
| 4,209,927 | 7/1980 | Donatelle | 40/607 |
| 4,241,530 | 12/1980 | Hartvig | 40/607 |
| 4,334,374 | 6/1982 | Spamer et al. | 40/606 |
| 4,408,407 | 10/1983 | Bloom et al. | 40/607 |

FOREIGN PATENT DOCUMENTS 0140576 3/1980 German Democratic Rep. ................................. 403/409

Primary Examiner—Carlton R. Croyle
Assistant Examiner—Leonard P. Walnoha
Attorney, Agent, or Firm—Flynn, Thiel, Boutell & Tanis

[57] ABSTRACT

A plug-in connection has two wedges (1, 2) with wedge surfaces (4, 4') inclined such that forces are created through the cooperation of the wedge surfaces (4, 4') in directions which are at a right angle to one another. A wobble-free fit in these two directions is achieved in this manner.

The fastening of an information carrier ($T_1$) on posts ($P_1$) is suggested as a special use, whereby with a short plug-in path of movement, a wobble-free fit of the information carrier ($T_1$) on the post ($P_1$) is achieved.

16 Claims, 4 Drawing Sheets

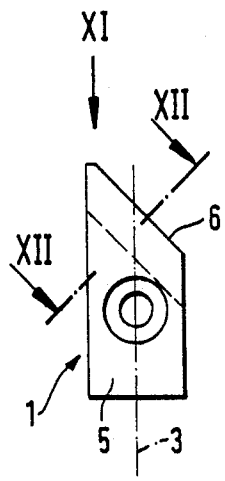
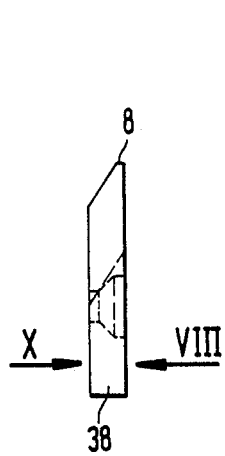
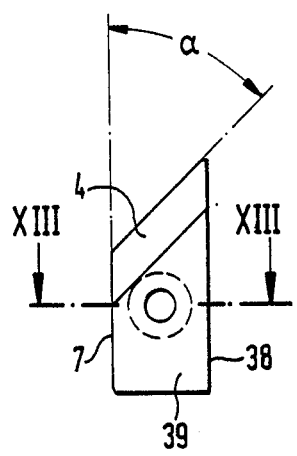
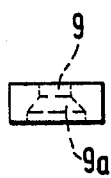
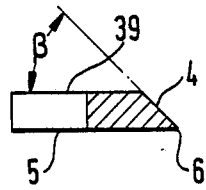
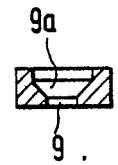

WEDGE CONNECTION ASSEMBLAGE

The invention relates to a plug-in connection, in which the parts, which are to be connected, are held together by wedge action.

BACKGROUND OF THE INVENTION

So called T-groove connections are known to connect board-shaped members to posts. These consist of profiles having a C-shaped cross section and being arranged on posts, and of profiles having a T-shaped cross section secured on the side edges of the board-shaped member, which can be moved in longitudinal direction into the T-profiles. This type of assembly requires much space above the post, namely clearance space which equals at least the height of the board-shaped member. Also an entirely wobble-free fit cannot be achieved because of the necessarily relatively large play between the profiles.

Connections with angular slots are also known for the same purpose, into which slots the bolts, which project laterally from the board-shaped member, are suspended. In order to also obtain a locking in longitudinal direction of the bolt, the bolt has an annular groove, the inside diameter of which is only a little less than the width of the angle slot and the width of which is only a little larger than the thickness of the wall in which the angle slot is provided. A somewhat wobble-free fit can be achieved only in a close-tolerance work, which in turn makes the installation more difficult. It is advantageous, in comparison with the T-groove connection, that only little space is needed above the posts, namely a clearance space which is approximately equal to the length of the vertical part of the angle slot. Similar problems, like the problems in connections with angle slots, occur is also known connections with keyhole-shaped openings.

Finally screw connections are also known for the connecting of board-shaped members to post, in which through extending screws are used. They are placed through holes, which are provided in the board-shaped member and on the post, namely in special fastening plates of fastening bars. This type of connection requires much work and is disadvantageous for the appearance of the information board.

The basic purpose of the invention is to provide a plug-in connection, in particular, however, not exclusively, for the use on an information board, which can be assembled with one short movement and results in a wobble-free fit.

The inventive plug-in connection is characterized by two cooperating wedges, the wedge surfaces of which can abut one another by a plug-in movement, whereby at least one wedge is arranged stationarily relative to two locking surfaces positioned angularly to one another, and the wedge surface defines with each of the two locking surfaces an acute angle, whereby in the locking position the wedge, which is movable relative to the two locking surfaces, rest with contact surfaces provided on the wedge on the locking surfaces.

The wedge surfaces cause, in a so constructed plug-in connection due to their special position relative to the locking surfaces, the introduced wedge to be pulled toward both locking surfaces. This achieves an absolutely wobble-free holding together of the wedges and thus the parts connected to it. It is hereby, for example, possible for one wedge to be arranged on a board-shaped member and the other wedge on a post. The plug-in connection can be effected with a short movement, so that only little space is needed for creating the connection.

The two acute angles can be the same with respect to the two locking surfaces. This, however, is not a necessary condition. The wedge surfaces may also be oriented such that the angles relative to the two locking surfaces are different. The angles may also vary in greater limits. Also the locking surfaces can define various angles with one another. It is particularly preferable when the locking surfaces are positioned at a right angle to one another.

According to an advantageous embodiment of the invention, the wedges are connected to profiles, which form locking surfaces. The profiles can then in turn be connected with parts, for example screwed, thus for example with a board-shaped member and a post. The profiles can be supplemented to one channel, in which the wedges lie. In this manner, the connection is stored protected and nonvisible, which is advantageous for the appearance of the entire construction. Particularly advantageous for the forming of a channel are profiles of an angular cross section, whereby also a type of a labyrinth connection can be provided.

The wedges consist advantageously of metal profiles. Two cooperating wedges can be created through a cross section extending inclined with respect to the longitudinal direction of the profile.

According to a further development of the invention, a locking pin is provided. This additional part is advantageous if the parts connected by the plug-in connection are to be secured with respect to one another. However, there are also cases where such a special safety measure is not needed.

Additional features of the invention include the provision an information board which is created with the help of plug-in connections of the afore-described inventive design. It is thereby advantageous to provide each two plug-in connections on an edge of the board-shaped member forming the information carrier. An exact alignment of the information carrier and a light stress on the individual plug-in connection is thereby achieved.

Particularly well suited are plug-in connections with associated profiles, whereby the profiles are associated with the parts to be connected. Screws, with which the wedges are held on the profiles can at the same time be used to fasten the profiles on the posts or the information carrier.

BRIEF DESCRIPTION OF THE DRAWINGS

The invention will be discussed further in connection with the enclosed drawings, which illustrate one exemplary embodiment and in which:

FIGS. 8 to 11 are views of various faces of one single wedge; and

FIGS. 12 and 13 are sectional views taken along the respective section lines XII—XII and XIII—XIII, respectively.

DETAILED DESCRIPTION

Figure 1:
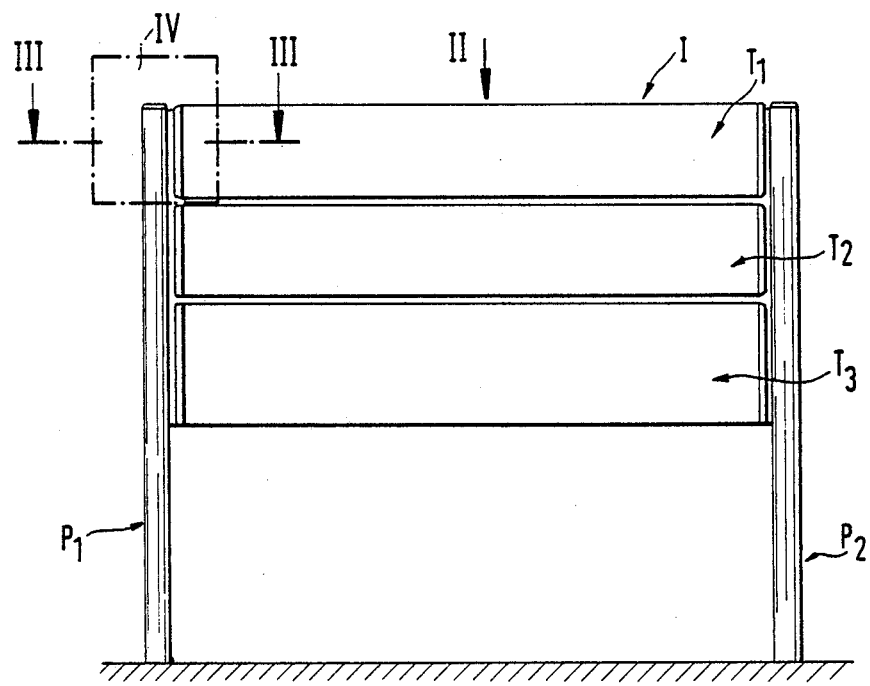
FIG. 1 is a front view of an information board according to the arrow I of FIG. 2.
Figure 2:
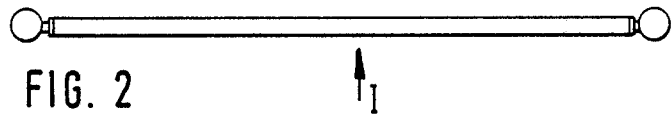
FIG. 2 is a top view of the information board in direction of the arrow II of FIG. 1.

The information board, which as a whole is identified by the Roman numeral I, has three board-shaped information carriers $T_1$, $T_2$, $T_3$ and posts $P_1$, $P_2$, on which the information carriers $T_1$, $T_2$, $T_3$ are connected by means of plug-in connections. Each information carrier $T_1$, $T_2$, $T_3$ is held on each of its side edges by two plug-in connections. Two wedges 1, 2 belong to each plug-in connections. Two cooperating wedges are mirror-inverted to one another. First one wedge is supposed to be examined in connection with FIGS. 8 to 13, whereby it is supposed to be assumed that it is a wedge 1.

The wedge 1 has a body with a rectangular cross section, which cross section can be seen from FIGS. 11 and 13. The longitudinal axis of the wedge body is identified by the reference numeral 3. The wedge surface 4 extends inclined with respect to the longitudinal axis. The wedge surface 4 forms with the wide surface 5 of the wedge body a cutting edge 6, which is inclined at an acute angle a with respect to the narrow side 7 of the wedge body. The angle $\alpha$ is 45° in the illustrated case. The altogether flat wedge surface is furthermore inclined such that it defines an angle $\beta$ with the wide side 5 in a cross-sectional plane XII—XII, which extends at a right angle with respect to the edge 6 and furthermore at a right angle with respect to the wide side 5. The angle $\beta$ is also 45° in the illustrated exemplary embodiment. By chamfering with the wedge surface 4, a tip would be created which, however, is removed by a small bevelling 8 in order to avoid the danger of injuries and a damage of the tip.

A hole 9 extends through the wedge body, which hole has a counterbore 9a to receive a screw head. The wedge body consists of aluminum.

The longer narrow side, which lies opposite the narrow side 7, is identified by the reference numeral 38 and the smaller wide surface, which lies opposite the wide surface 5, is identified by the reference numeral 39.

The wedge 2 cooperating with the wedge 1 is constructed mirror-inverted with respect to any of the side surfaces of the wedge body, for example mirror-inverted with respect to the narrow side 7. Two cooperating wedges can be manufactured such that a rectangular profile is cut through on an angle, whereby wedge surfaces are created simultaneously on both wedges.

A profile 11 of a substantially angular cross section is secured on each lateral front surface of each information carrier $T_1$, $T_2$, $T_3$. A further angular profile 12 is secured on each post $P_1$, $P_2$ which profile 12, together with the profile 11, defines a space 13, in which the wedges 1, 2 lie. The space is created only after the plug-in connection has been created.

The profile 11 is substantially angular and has a fastening leg 14 and a sidewall leg 15. A barlike projection 16 is provided on the fastening leg 14, which projection 16 is received in a groove 17 provided on the information carrier $T_1$, namely on a cap 18 forming the lateral front surface of the information carrier. A recess 19 (notch) is provided in the free edge of the fastening leg 14. An abutment strip 20 for engaging the profile 12 is provided on the sidewall leg 15. The inner surface 14a of the fastening leg forms a first locking surface and the inner surface 15a of the sidewall leg 15 a further locking surface.

The profile 12 has a fastening leg 21 and a sidewall leg 22. An abutment strip 23 for receipt in the recess 19 of the profile is provided on the sidewall leg 22.

The fastening leg 21 has a hollow-cylindrical contact surface 24, which is conformed to the cylindrical circumferential surface 25 of the post $P_1$. A recess 26 (notch) exists in the fastening leg 21 for receiving the abutment strip 20 on the profile 11. The inner surface 21a of the fastening leg 21 and the inner surface 22a of the sidewall leg 22 form again locking surfaces.

Figure 4:
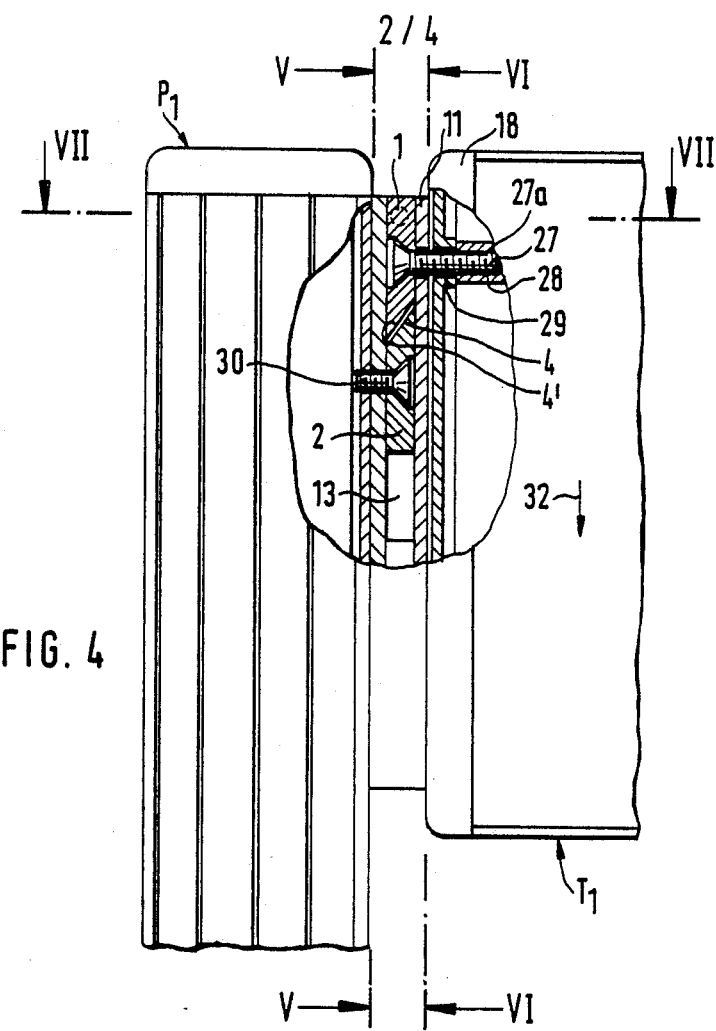
FIG. 4 illustrates an enlarged section of FIG. 1 in the area of the dash-dotted frame IV of FIG. 1, whereby a plug-in connection is illustrated in a vertical cross section.

The connection of the wedges with the associated profile and the connection of the profiles with the associated structural part of the information board can be seen in FIG. 4.

A self-tapping screw 27 extends through the wedge 1 and is screwed with its thread part 27a into the information carrier $T_1$, for which purpose the information carrier has a screw channel 28. The screw 27 extends through a hole 29 in the cap 18. Thus, the screw 27 connects so to speak four parts with one another, namely the part 1, the profile 11, the cap 18 and the base member of the information carrier $T_1$.

Figure 5:
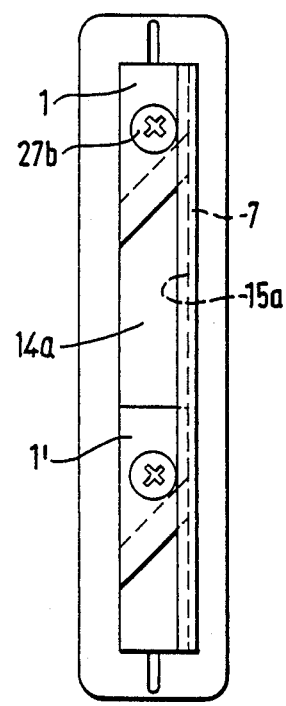
FIG. 5 is a view of the front side of an information board corresponding with the arrows V—V of FIG. 4.

The screw head 27b lies in a counterbore 9a (FIG. 11) of the wedge 1. The wedge abuts with its narrow side 7 the inner surface 15a of the sidewall leg 15 of the profile 11. The oppositely lying narrow side is in alignment with the outer surface of the fastening leg 14. This can be seen in FIG. 5. FIG. 5 also shows a further wedge 1' being arranged below the wedge 1. The wedge 1' is constructed like the wedge 1 and is also oriented in the same way.

Figure 6:
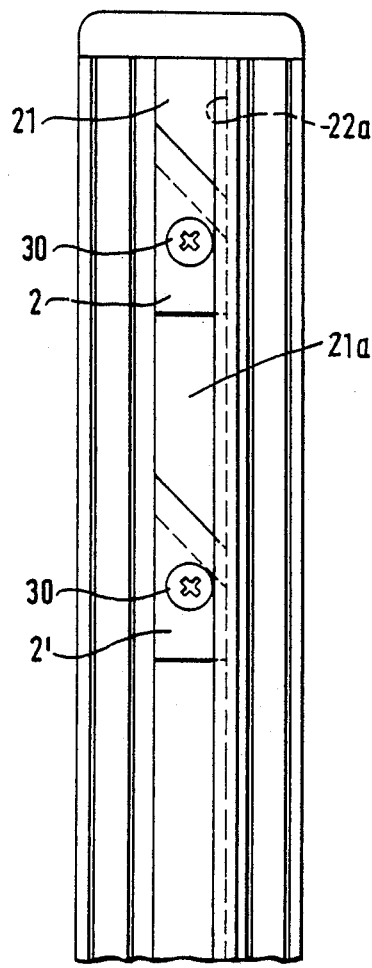
FIG. 6 is a partial side view of a post corresponding with the arrows VI—VI of FIG. 4.

A wedge 2 is secured by means of a self-tapping screw 30 on the post $P_1$. The screw 30 is placed through the wedge 2 and is screwed into a predrilled hole in the post wall. As shown in FIG. 6, the wedge 2 rests with its short narrow side on the inner surface 22a of the sidewall leg 22. The oppositely lying long narrow side is in alignment with the outer surface of the fastening leg 21.

A further wedge 2' is secured below the wedge 2, whereby the distance between the wedges 2, 2' is the same as the distance between the wedges 1, 1'. Three parts are connected by the screws 30, namely the wedges 2, 2' to the profile 12 and the profile 12 to the post $P_1$.

Figure 3:
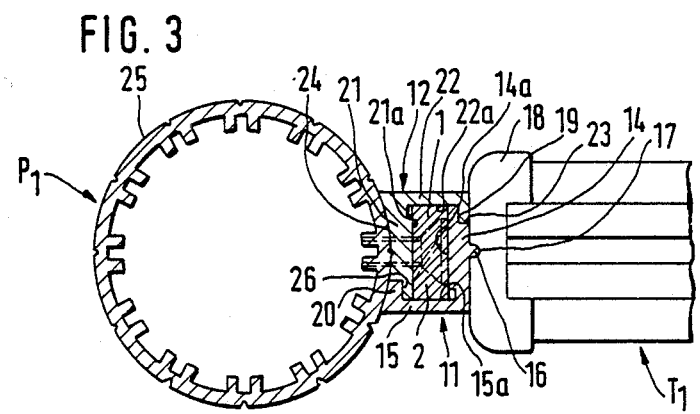
FIG. 3 is a partial cross-sectional view taken along the line III—III of FIG. 1 in a scale which is enlarged compared with FIG. 1.
Figure 7:
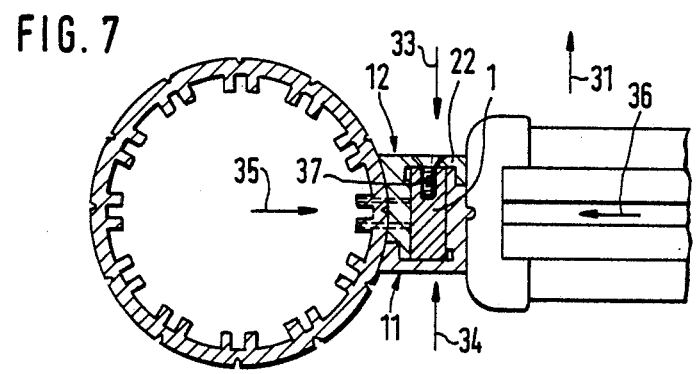
FIG. 7 is a horizontal cross-sectional view taken along the line VII—VII of FIG. 4.

The information carriers $T_1$, $T_2$, $T_3$ are connected to the posts $P_1$, $P_2$ as follows. The mounting of the lowermost information carrier $T_3$ takes place first, followed by a fastening of the information carrier $T_2$ and finally a fastening of the information carrier $T_1$. A horizontal movement of the information carrier in direction of the arrow 31 is hereby first necessary (see FIG. 7), whereby the information carrier is in such an elevational position tht the wedges 1, 1' on the information carrier (for example $T_1$) can pass the wedges 2, 2' on the post $P_1$ (and of course on the post $P_2$). The profiles 11, 12 are in such an engagement at the end of the horizontal movement as this is shown in FIGS. 3 and 7. The information carrier is thereafter moved downwardly parallel with the posts $P_1$, $P_2$ in direction of the arrow 32 in FIG. 4. For clarification purposes, it is remarked that FIG. 4 already shows the state at the end of the downward movement. During this downward movement, the wedge surfaces 4 of the wedges 1, 1' finally come into contact with the wedge surfaces 4' of the wedges 2, 2'. Because of the special inclination of the wedge surfaces 4, 4', a wedging so to speak in two directions occurs. This wedging action causes on the one hand the profiles 11, 12 to be pulled together in direction of the arrows 33, 34 shown in FIG. 7 and on the other hand in direction of the arrows 35, 36. This results in a wobble-free fit.

To secure the information carriers $T_1$, $T_2$, $T_3$ against a lifting off, the uppermost information carrier $T_1$ can be secured by a locking screw 37. The locking screw 37 is placed through the sidewall leg 22 of the profile 12 and is screwed into the wedge 1. The uppermost information carrier $T_1$ can be lifted out only after removal of the locking screw 37. By securing the uppermost information carrier $T_1$, the information carriers $T_2$ and $T_3$ provided therebelow are also secured, since they cannot be lifted sufficiently to cause the cooperating wedges of the wedge connections to be separated from one another.

For clarification purposes, it is remarked that a wedging can also be achieved if only one of the parts finds support surfaces for its side surfaces. Thus, it would be possible to omit the sidewall leg 15 or 22 from one of the profiles 11, 12. However, it is preferable for the mechanical protection of the wedge connection and also for the appearance of the entire information board I, if profiles 11, 12 are used, which supplement one another to form a channel.

It would even be possible to arrange one of the wedges so to speak without a contact surface on the narrow side. It would then press against one of the two contact surfaces, for example the contact surfaces 14a, 15a. The contact surfaces also do not need to be parts of profiles, but can be formed for example by projections on the wedge itself.

The embodiments of the invention in which an exclusive property or privilege is claimed are defined as follows:

1. A wedge connection assemblage for connecting a first member to a second member, comprising:
   first and second wall means externally of said first member and defining first and second locking surfaces which are perpendicular to one another, said first wall means extending toward said second member which has a third and fourth wall means externally thereof and defining third and fourth locking surfaces which are perpendicular to one another, said third wall means extending toward said first member in laterally spaced relation to said first wall means, said second and fourth wall means being in opposing relation to one another;
   a first wedge member stationarily provided on said second locking surface between said first and third locking surfaces, said first wedge member having a first sidewall in abutting relation with said first locking surface and a second sidewall contiguous with said first sidewall, said second sidewall being inclined to said second locking surface so as to define a first acute angle therewith, said second sidewall also being inclined to said first locking surface so as to define a second acute angle therewith;
   a second wedge member stationarily provided on said fourth locking surface between said first and third locking surfaces, said second wedge member having a third sidewall in abutting relation with said third locking surface and a fourth sidewall contiguous with said third sidewall, said second wedge member being in vertically aligned relation to said first wedge member so that said second and fourth sidewalls extend parallel and opposed one another, a fifth sidewall on said first wedge member facing oppositely to said first sidewall and a sixth sidewall on said second wedge member facing oppositely to said third sidewall, an engagement of said second and fourth sidewalls causing, due to the influence of gravity and the weight of said first member, a relative lateral movement between said first and second wedge members and an engagement of said fifth sidewall with said third locking surface and an engagement of said sixth locking surface with said first locking surface.

2. The wedge connection assemblage according to claim 1, wherein said first and second acute angles are the same with respect to each of said first, second, third and fourth locking surfaces.

3. The wedge connection assemblage according to claim 1, wherein said first and second acute angles lie in the range of 30° to 60° to each of said first, second, third and fourth locking surfaces.

4. The wedge connection assemblage according to claim 3, wherein said acute angles are each 45°.

5. The wedge connection assemblage according to claim 1, wherein said locking surfaces on each of said first and second members are positioned at a right angle to one another.

6. The wedge connection assemblage according to claim 1, wherein said first and second wall means and said third and fourth wall means are each defined by a profiled member secured to a respective one of said first and second members.

7. The wedge connection assemblage according to claim 6, wherein said profiled members form together a channel, in which said first and second wedge members lie.

8. The wedge connection assemblage according to claim 7, wherein said profiled members each have substantially an angular cross section, each angle leg forming a wall of a hollow substantially rectangular channel and the inner surfaces of said channel walls defining said locking surfaces.

9. The wedge connection assemblage according to claim 8, wherein said angle legs forming said first and third wall means of an assembled wedge connection each have an abutment strip which overlaps an adjoining profile, an overlapped region on at least one angle leg having a notch adapted to receive therein said abutment strip.

10. The wedge connection assemblage according to claim 1, wherein each of said first and second wedge members consist of metal blocks having a rectangular or square cross section.

11. The wedge connection assemblage according to claim 1, wherein a locking pin is provided for preventing a pulling apart of said wedge members.

12. The wedge connection assemblage according to claim 11, wherein said locking pin extends through a profile which is engaged with one of said wedge members.

13. The wedge connection assemblage according to claim 1, wherein said first member consists of at least one of an information carrier and a post and said second member consists of the other of said information carrier and said post, wherein said information carrier is mounted on said posts by means of said wedge connection assemblage.

14. The wedge connection assemblage according to claim 13, wherein said information carrier is connected at each side edge with two or more wedge connection assemblages offset against one another along the side edges to adjoining said posts.

15. The wedge connection assemblage according to claim 13, wherein said wedge connection assemblages are constructed by providing at least two wedge members which are in abutting relation with said locking surfaces, one locking surface being secured on said post and the other locking surface on an adjacent side edge of said information carrier.

16. The wedge connection assemblage according to claim 15, wherein fastening screws are provided which extend through openings provided in said wedge members and said locking surfaces and are screwed into said post or said information carrier and in this manner simultaneously connect said wedge members and said locking surfaces with said post or said information carrier.

* * * * *

UNITED STATES PATENT AND TRADEMARK OFFICE
CERTIFICATE OF CORRECTION

PATENT NO.    :   4 811 508
DATED         :   March 14, 1989
INVENTOR(S) :   Karl Hermann WEYEL et al.

It is certified that error appears in the above-identified patent and that said Letters Patent is hereby corrected as shown below:

On the face of the patent, please add the names and addresses of the two additional inventors as follows:

---Karl Hermann Weyel, Haiger/Hessen, West Germany; and
   Klaus Winn, Giessen, West Germany---

Signed and Sealed this

Fourteenth Day of November, 1989

*Attest:*

JEFFREY M. SAMUELS

*Attesting Officer*     *Acting Commissioner of Patents and Trademarks*